United States Patent
Chou et al.

(10) Patent No.: US 8,078,623 B2
(45) Date of Patent: Dec. 13, 2011

(54) SYSTEMS AND METHODS FOR SUMMARIZING PHOTOS BASED ON PHOTO INFORMATION AND USER PREFERENCE

(75) Inventors: Chen-Wei Chou, Hualien County (TW); Chih-Chao Ma, Taichung (TW); Ho-Chao Huang, Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 291 days.

(21) Appl. No.: 12/578,649

(22) Filed: Oct. 14, 2009

(65) Prior Publication Data

US 2011/0087666 A1  Apr. 14, 2011

(51) Int. Cl.
 *G06F 7/00* (2006.01)
(52) U.S. Cl. ......... 707/737; 707/915; 382/159; 382/224
(58) Field of Classification Search .................. 707/737, 707/915; 382/159, 224
 See application file for complete search history.

(56) References Cited

U.S. PATENT DOCUMENTS

| | | | |
|---|---|---|---|
| 6,961,463 B1 | 11/2005 | Loui et al. | |
| 7,477,805 B2* | 1/2009 | Ohtsuka et al. | 382/305 |
| 2002/0107973 A1 | 8/2002 | Lennon | |
| 2003/0195883 A1 | 10/2003 | Mojsilovic | |
| 2004/0258304 A1 | 12/2004 | Shiota et al. | |
| 2006/0004685 A1* | 1/2006 | Pyhalammi et al. | 707/1 |
| 2006/0159442 A1* | 7/2006 | Kim et al. | 396/236 |
| 2006/0259863 A1 | 11/2006 | Obrador et al. | |
| 2006/0271691 A1 | 11/2006 | Jacobs et al. | |
| 2007/0242902 A1 | 10/2007 | Kobayashi | |
| 2007/0271297 A1 | 11/2007 | Jaffe et al. | |
| 2008/0068469 A1 | 3/2008 | Takagi | |
| 2008/0089590 A1 | 4/2008 | Isomura et al. | |
| 2008/0091723 A1* | 4/2008 | Zuckerberg et al. | 707/104.1 |
| 2008/0187231 A1 | 8/2008 | Barbieri et al. | |
| 2009/0002522 A1 | 1/2009 | Murai | |

OTHER PUBLICATIONS

Cunningham et al., JCDL '07, Jun. 18-23, Vancouver, British Columbia, Canada, pp. 400-401.*
Adcock et al., MM'03, Nov. 2-8, 2003, Berkeley, California, USA, pp. 598-599.*
Kuchinsky et al., CHI'99, Pittsburgh, USA, pp. 496-503.*
European Search Report, mailing date of Dec. 30, 2010.

* cited by examiner

*Primary Examiner* — Cheyne Ly
(74) *Attorney, Agent, or Firm* — Thomas, Kayden, Horstemeyer & Risley, LLP

(57) ABSTRACT

Systems and methods for generating a summary of photos from a plurality of received photos are described. The received photos are classified according to predefined attributes. Two or more of the categories are selected, and a ratio value is received from a user relating to the two or more of the categories. Photos are selected from among the photos in the two or more categories based on the specified ratio and based on sorting the received photos according to time information. The selected photos comprising the summary of photos are displayed.

27 Claims, 14 Drawing Sheets

SYSTEMS AND METHODS FOR SUMMARIZING PHOTOS BASED ON PHOTO INFORMATION AND USER PREFERENCE

TECHNICAL FIELD

The present disclosure generally relates to electronic photo management and more particularly, relates to deriving photo summaries based on photo information and user preference.

BACKGROUND

With the widespread use of digital cameras, many individuals turn to image management tools to archive and organize their digital photographs. Image management tools found on the market offer various features, including automatic image organization. The archived images may be later viewed by the individual or published for others to view. Image management tools may also be used to search for particular individuals, landscapes, or other objects within a collection of photographs. Such applications may be useful, for example, when a user wishes to identify all photos of a particular individual relating to a particular trip. Challenges may arise, however, when trying to organize and search through a large volume of photos, particularly as more photos are added to an individual's archive and as the photos cover an increasing number of events. Furthermore, an individual may want to display a subset of photos representing a summary of photos associated with, for example, a particular event, a particular time period, or a particular geographic location. While manually organizing photos is an alternative, this approach can be tedious and time-consuming.

SUMMARY

Various embodiments for generating a summary of photos from a plurality of received photos are described. One embodiment is a method that comprises classifying the received photos into one or more categories according to predefined attributes, receiving through a controller on a user interface one or more criteria for generating a summary of photos according to a user preference, selecting from among photos in each of the categories according to received criteria, and generating the summary of photos by selecting one or more subsets of the selected photos for each of the categories.

Another embodiment is a system that comprises a classifier for classifying the received photos into one or more categories according to predefined attributes and a ratio configurator for receiving a specified ratio from a user relating to two or more of the categories. The system further comprises a selector for selecting photos from among the photos in the two or more categories based on the specified ratio and an album generator for displaying the selected photos.

A method is described for generating a summary of photos from a plurality of received photos and comprises classifying the received photos into categories, selecting two or more of the categories and receiving a ratio value from a user relating to the two or more categories, selecting photos from among the photos in the two or more categories based on the specified ratio, and displaying the selected photos representing the summary of photos.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
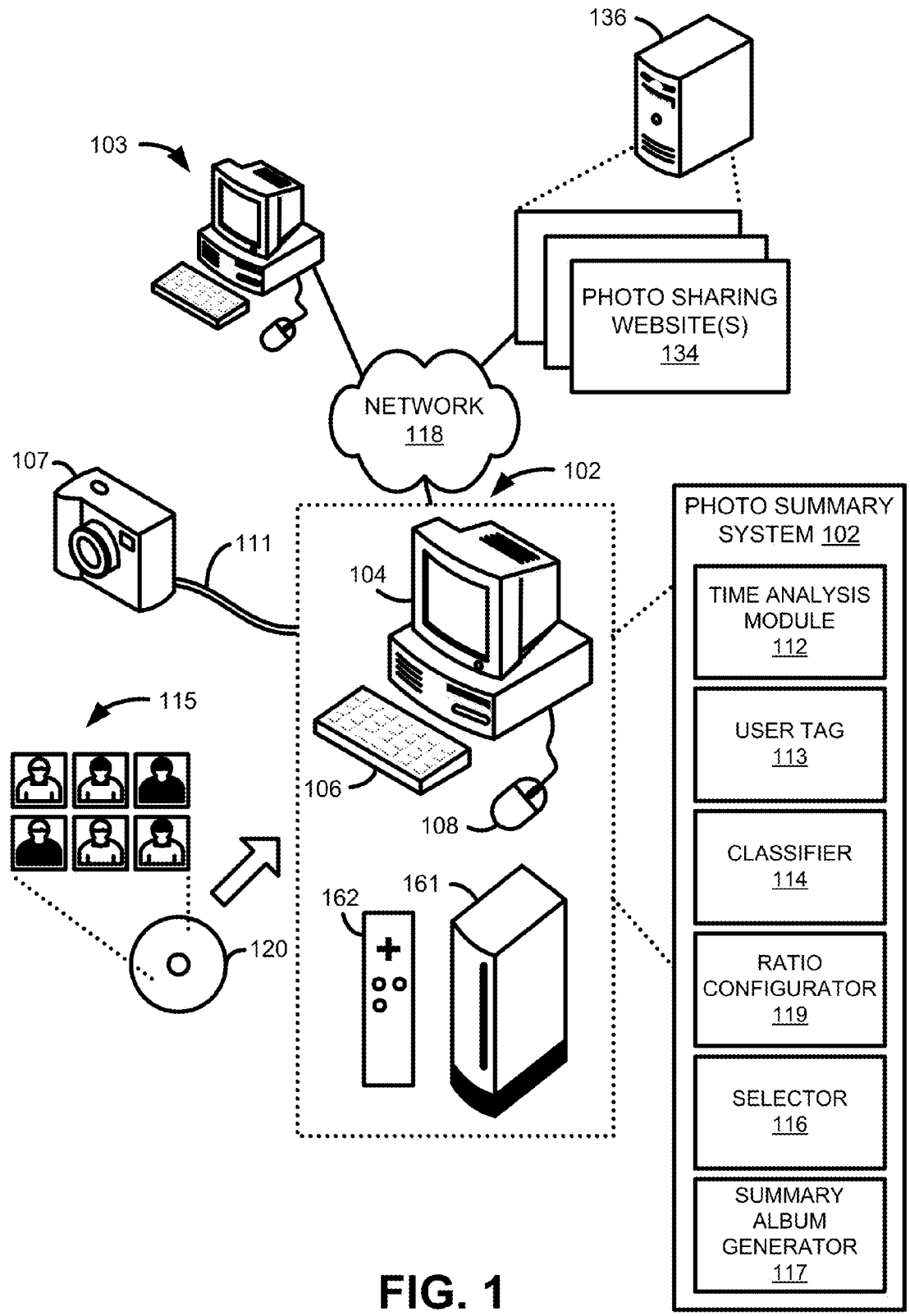
FIG. 1 depicts a top-level diagram of a photo summary system for creating a summary of photos according to user input.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As discussed in the background section, it can be challenge to organize a large volume of photos, particularly as more photos are added to an individual's archive and as the photos cover an increasing range of events. An individual may also want to display a subset of photos representing a summary of photos associated with, for example, a particular event, a particular time period, or a particular geographic location. While manually organizing photos is an alternative, this approach can be tedious and time-consuming when dealing with thousands of pictures. For purposes of this disclosure, the phrase "summary of photos" broadly refers to a collection of photos selected based on user preference. The collection may comprise a subset of all available photos and may comprise photos related based on one or more attributes. By way of illustration, suppose a user has a total of 1,000 digital photos and wishes to generate a summary of photos comprising no more than 50 representative photos related based on one or more attributes. One attribute a user may rely on for selecting summary photos may relate to those photos taken during a particular trip. Manually sorting through the 1,000 digital photos for 50 representative photos based on this attribute can be tedious and time-consuming.

Various embodiments are thus described for generating a summary of photos from a collection of photos. One embodiment includes a method for generating a summary of photos from a collection of photos. The collection of photos may cover a large number of objects, ranging from photos of individuals to photos of food to scenic photos. The embodiment comprises classifying the received photos into one or more categories according to predefined attributes, receiving one or more criteria for generating a summary of photos according to a user preference, selecting from among photos in each of the categories according to received criteria, and generating the summary of photos by selecting one or more subsets of the selected photos for each of the categories. As will be described in more detail below, the one or more criteria may be received through a controller provided on a user interface and may comprise a target number of summary photos and a target ratio relating to multiple categories.

For each of the categories with specified criteria, a selection is made from among all the photos in each of the categories with received criteria to narrow down the photos to a subset of photos according to the one or more criteria. Based on the selection, a summary of photos is generated by displaying the subset of photos for each of the categories according to predefined attributes. The predefined attributes comprise such parameters as picture quality, exposure level, degree of focus, color contrast, color saturation, color layout, color histogram, edge layout, face information, time information, and geographic location. In accordance with some embodiments, the categories described above may comprise indoor photo shots, outdoor photo shots, night/day photos, photos comprising food, photo quality, photos of scenery, the presence of a plurality of individuals, and the presence of only a single individual. Various components of an environment in which various embodiments operate are now described followed by a description of the operation of these components.

FIG. 1 depicts a top-level diagram of a photo summary system 102 for creating a summary of photos according to user input. The photo summary system 102 may be embodied, for example, as a desktop computer, a computer workstation, or a laptop. The photo summary system 102 includes a display 104 and input devices such as a keyboard 106 and a mouse 108 for receiving user preferences. In other embodiments, the photo summary system 102 may also be embodied as a video gaming console 161, which includes a video game controller 162 for receiving user preferences. For such embodiments, the video gaming console 161 may be connected to a television (not shown) or other display.

The photo summary system 102 comprises a time analysis module 112, which receives a collection of photos 115. Based on time information associated with the photos 115, the time analysis module 112 sorts the photos 115. Digital photos taken by digital cameras today are typically stored according to the Exchangeable Image File format (EXIF) standard. As generally known, the EXIF standard incorporates metadata tags, which store a wide range of information including such information as camera settings and date/time information. The time information contained in the metadata tags may be utilized by the time analysis module 112 for sorting the photos 115. For photos 115 that don't include EXIF metadata, other time information may be derived or generated. For example, time information can be extracted based on the time the photo is created or modified. In other embodiments, a descriptive name of a photo (e.g., 20070306_travel.jpg) may provide useful timing information that can be analyzed by the time analysis module 112.

The photo summary system 102 further comprises a user tag module 113, which receives input from users relating to specific photos 115. Such input may comprise a tag indicating, for example, whether a particular photo should be included or excluded from the summary of photos. The tag may also comprise a description of an event (e.g., "2009 beach trip"). This feature allows a user to incorporate certain preferred photos or to filter certain photos from the summary of photos. The photo summary system 102 also comprises a classifier 114, which receives photos 115 and classifies each photo 115 according to categories. Various categories include by way of example and without limitation, photos of individuals, photos comprising the presence of a plurality of individuals and/or the presence of only a single individual, scenery and landscape photos, photos of food, night photos, day photos, indoor photo shots, outdoor photo shots, photos relating to a specific geographic location, time, quality and so on.

A ratio configurator 119 is also included in the photo summary system 102 which allows a user to specify a desired ratio between two or more categories for purposes of generating a summary of photos. For example, a user may specify a ratio of 2:1 for the number of photos depicting individuals to the number of photos of food. For some embodiments, the categories relating to the ratio may be predefined or assigned a default value. In other embodiments, however, the categories may be controlled by the user and adjusted in real-time, where the summary of photos is immediately updated as a user adjusts the ratio using a controller such as a slider bar or an edit box. More details regarding this process are described below. The selector 116 selects some or all the photos 115 based on ratio configurator 119. Note that the selector 116 may also select photos based on user tag data received by the user tag module 113 described earlier. The summary album generator 117 receives the results from the selector 116 and displays the summary of photos. In accordance with various embodiments, the summary of photos is then stored in a folder for future access. This may comprise, for example, retrieving the summary of photos to construct a slideshow. As another example, the summary of photos may be uploaded to a website such as Facebook® to share with others. For other embodiments, the summary of photos may be output or displayed directly as a slideshow, a list or grid of thumbnail photos, or as a list of photo file names. Furthermore, the summary result can be automatically uploaded to an album, community website, or other destination.

The photo summary system 102 in FIG. 1 may receive digital images 115 stored on a storage medium such as, for example, a compact disc (CD) 120 or a universal serial bus (USB) flash drive. As one of ordinary skill will appreciate, the digital images 115 may be encoded in any number of formats, including but not limited to, JPEG (Joint Photographic Experts Group) files, TIFF (Tagged Image File Format) files, PNG (Portable Network Graphics) files, GIF (Graphics Interchange Format) files, and BMP (bitmap) files. As depicted in FIG. 1, the photo summary system 102 may also receive digital images 115 directly from a digital camera 107 via a cable 111 or some other interface. The photo summary system 102 may support any one of a number of common computer interfaces, such as, but not limited to IEEE-1394 High Performance Serial Bus (Firewire), USB, a serial connection, and a parallel connection.

The digital camera 107 may also be coupled to the photo summary system 102 over a wireless connection or other communication path. The photo summary system 102 may be coupled to a network 118, such as the Internet or a local area network (LAN). Through the network 118, the photo summary system 102 may receive digital images 115 from another photo summary system 103. Alternatively, the photo summary system 102 may access one or more photo sharing websites 134 (e.g., Picassa from Google, Flickr®) hosted on a server 136 via the network 118 to retrieve digital images 115.

Figure 2:
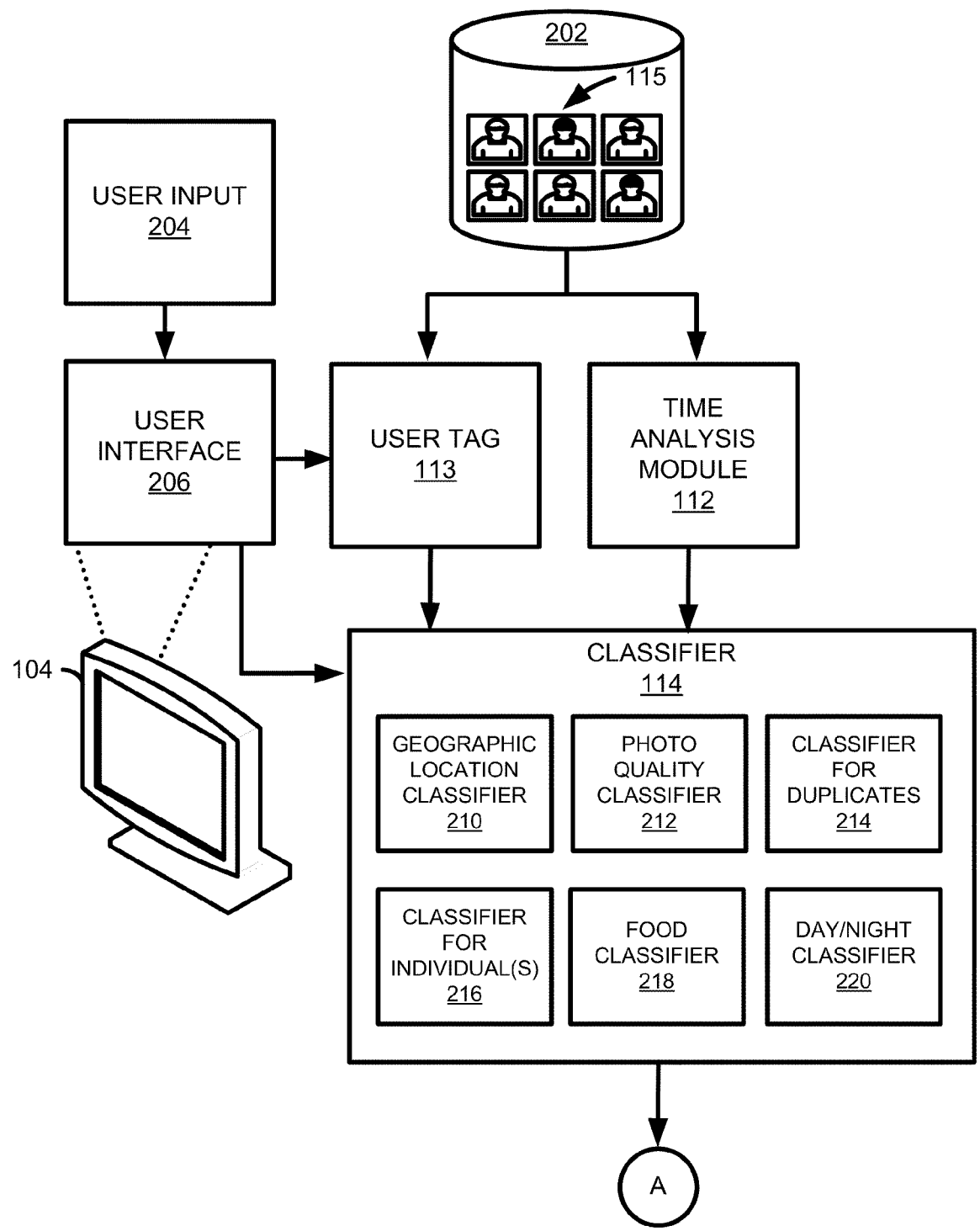
FIGS. 2-3 depict a flow diagram for the various components of the photo summary system of FIG. 1.

FIG. 2 provides a flow diagram for the various components of the photo summary system 102 of FIG. 1. After digital photos 115 are received by the photo summary system 102, the photos 115 may be stored locally in a memory device 202 for processing. The user tag module 113 receives user input 204 via a user interface 206 provided on the display 104 of the photo summary system 102. The user input 204 comprises tag data to be associated with particular photos 115 and affects whether particular photos 115 are displayed as part of the summary of photos or excluded altogether.

The time analysis module 112 extracts timing information from the photos 115 and sorts the photos based on this information. Note that the original order of the photos 115 may not necessarily depend on time. Therefore, the order of the photos 115 derived by the time analysis module 112 can provide useful information relating to the sequence in which the photos 115 were taken. Furthermore, the distribution of photos 115 over time may be analyzed. For example, there might be a higher concentration of photos 115 within a particular window of time. Based on this, the time analysis module 112 may infer that photos taken within this window of time correspond to the same event. As an illustration, suppose a traveler takes several photos at one scenic spot during a five-minute interval and then later takes a series of photos at another scenic spot half an hour later. Based on this time distribution, the time analysis module 112 may infer that the photos taken within the five-minute interval relate to the same event. For some implementations, the time analysis module 112 may store this information as metadata with each of those photos. Such information may be then used by the classifier 114 for categorizing the photos and for reducing or eliminating the number of duplicate photos in the summary of photos. For example, one representative photo may be selected from among all the photos taken in the five-minute interval.

In this regard, by observing the distribution of time, the time analysis module 112 can perform clustering on the photos 115 and infer that different clusters relate to different events. For some embodiments, the time analysis module 112 performs clustering based on the following clustering analysis. First, the received photos 115 are sorted according to the corresponding time information. Next, the time analysis module 112 sets a threshold time interval (e.g., 2 hours). The time analysis module 112 then checks the time difference between each pair of consecutive photos. If the time difference is greater than the threshold, the time analysis module 112 identifies this as a separate event and inserts a division marker between the two photos 115. Finally, the time analysis module 112 divides the original collection of photos 115 into several groups or events according to the division markers. Depending on the implementation, the division markers may be visible or invisible to users.

Alternatively, the time analysis module 112 may perform the following clustering analysis. First, the photos 115 are initially sorted based on their corresponding time information. A smaller time interval (e.g., 10 minutes) is threshold is selected, and the time difference between each set of consecutive photos is checked. The time analysis module 112 groups two or more photos 115 together if the consecutive time differences of these photos are less than the threshold. For example, consider three consecutive photos A, B, and C. If the time difference between A, B and between B, C are both less than the threshold, then the time analysis module 112 groups photos A, B, C together as one group. Next, the time analysis module 112 performs comparisons at the group level and checks each set of consecutive groups. Groups are then merged together to form larger groups based on the time differences between the two groups and other nearby groups. Comparisons at the group level are performed until no more groups are left.

As mentioned above, the groups of photos 115 derived by the time analysis module 112 may be used as a criterion by the selector 116 later on. As the photos 115 in a particular group may have certain similarities, selections can be performed at the group level first in order to reduce redundancy of selected photos. If all but one photo in a given group is excluded by the selection procedure, the remaining photo may be considered to be more important or unique and will more likely to be included in the photo summary. As such, the results generated by the time analysis module 112 are later utilized by the selector 116 for selecting a subset of photos 115 for the photo summary.

The classifier 114 receives the sorted photos 115 from the time analysis module 112 in addition to tag data associated with some or all of the photos 115 from the user tag module 113. Upon receiving the photos 115, the classifier 114 groups the photos 115 into various predefined categories according to predefined attributes. For some implementations, the categories may comprise a combination of preset categories and categories specified by the user via user input 206. The classifier 114 includes various classifier modules 210, 212, 214, 216, 218, 220 for identifying photos 115 that belong in each particular category. Generally, the classifier 114 includes a geographic location classifier 210 for identifying photos associated with a particular scenery element or particular landscape. For example, the geographic location classifier 210 might group together photos 115 depicting the ocean. For some implementations, one or more baseline photos are provided to the geographic location classifier 210, which then uses the one or more baseline photos identify other photos 115 with similar characteristics. For example, a baseline photo might contain the Eiffel Tower in the background. The geographic location classifier 210 then uses this baseline photo to identify other photos depicting the Eiffel Tower.

The classifier 114 also includes a photo quality classifier 212 which classifies photos 115 based upon quality. For example, photos 115 taken at a resolution of 10 megapixels or higher are groups together. The photo quality classifier 212 may analyze other photo quality attributes such as the exposure level, degree of focus, color contrast, color saturation, among other attributes. As other measures of photo quality, the photo quality classifier 212 may analyze photos to detect faces with smiles or faces with closed eyes. For some implementations, faces with closed eyes are classified as having a relatively low rating, while faces with smiles are classified as having a relatively high rating. Generally, photos 115 with higher quality ratings are selected ahead of photos 115 having lower quality ratings. For some implementations, photos of individuals with their eyes closed may be eliminated altogether in that such photos are excluded from the summary of photos. The classifier for duplicates 214 identifies photos which are either exact duplicates or substantial duplicates of each other. The classifier for individuals 216 identifies photos 115 of particular individuals.

As with the geographic location classifier 210, the classifier for individual(s) 216 may receive one or more baseline photos used for identifying other photos 115 with similar attributes. For example, a baseline photo of the individual John might be provided to the classifier 216 to help identify other photos 115 depicting John. The classifier for individual(s) 216 may utilize face detection technology to not only identify the presence of faces and determine names associated with faces in photos, but also to make certain assumptions based on observed historical trends. For example, the classifier 216 may scan photos and detect facial regions/areas to define windows capturing facial regions/areas. If more than one facial window is found in a given photo, classifier 216 infers that there are multiple individuals depicted in the photo. The classifier 216 may also observe that person A and person B appear in many of the same photos. For example, a husband and wife couple traveling may appear in many of the same photos. Thus, if the classifier of individual(s) 216 identifies the husband in a particular photo, the classifier 216 might infer that the other individual in the photo is the wife based on past photos that have been analyzed. As another example, if a particular person constantly appears in a large number of photos, it may be inferred that the individual is a focal point of that photo set. Thus, more photos of that individual are selected for the summary of photos. Another embodiment comprises selecting different combinations of people (e.g., A and B, B and C, A and C, A and B and C) to capture various combinations of people and to ensure a balanced distribution of individuals captured in the photo summary.

For other embodiments, the classifier for individuals 216 identifies photos 115 of particular individuals by scanning a window within each photo and determining whether the window contains the face of an individual. Feature vectors of the face regions are extracted according to such attributes as color, intensity, and local/global patterns. The classifier 216 then groups the faces into clusters according to distance between feature vectors. The classifier 216 may group faces into clusters based on the fact that the faces are similar and likely correspond to the same individual. For some implementations, users may then enter tagging data such as a name to be associated with the similar faces grouped together. In other implementations, the classifier 216 may determine that some faces are similar to other faces which have already been tagged. The classifier 216 may then associate the same tagging data (e.g., name) with the untagged faces. In this regard, photos of faces are classified according to individuals. The tagging data may be stored as metadata on the photo summary system 102.

The food classifier 114 generally identifies pictures depicted food. For some embodiments, the classifier 114 may be configured to analyze EXIF metadata, which may specify not only time information, but also the camera settings at the time the photo was taken. The camera settings may include the shutter speed, focal length, and diaphragm size. Other settings may include exposure, focus, contrast, saturation, and so on. This information may be used to correlate certain types of photos (e.g., photos of food, night photos) with particular camera settings. Based on this additional information, the classifier 114 is able to classify photos 115. The geographic location classifier 210 may also use GPS information contained in EXIF metadata to identify a certain geographic location depicted in a photo. Alternatively, the geographic location classifier 210 may identify landmarks (e.g., the Eiffel Tower) in classifying photos 115. Furthermore, the classifier for duplicates 214 may identify duplicates based on such photo content as color histograms, dominant colors, color layout, edge maps, and EXIF information such as timing information, GPS information, and so on.

For embodiments that evaluate color histograms of photos, the classifier for duplicates 214 evaluates whether a difference between the color distributions for two photos is below a threshold. If the difference is below the threshold, the classifier for duplicates 214 classifies the two photos as duplicates. Specifically, the analysis may comprise dividing each photo image into several blocks, and comparing the color difference between corresponding blocks. If the sum of the total block difference is lower than the threshold, the two photos are classified as duplicates. Alternatively, the analysis may comprise dividing each photo image into several blocks and computing the edge distribution in each block. The analysis further comprises comparing the edge distribution difference between corresponding blocks. If the sum of total block difference is lower than the threshold, the two photos are classified as duplicates. If one or more duplicates are found, then the photo with the higher or highest quality rating is selected. Note that the user may also specify which photo among duplicates is selected. For example, the user may specify that the photo among the duplicates with the most recent time tag be selected.

Figure 3:
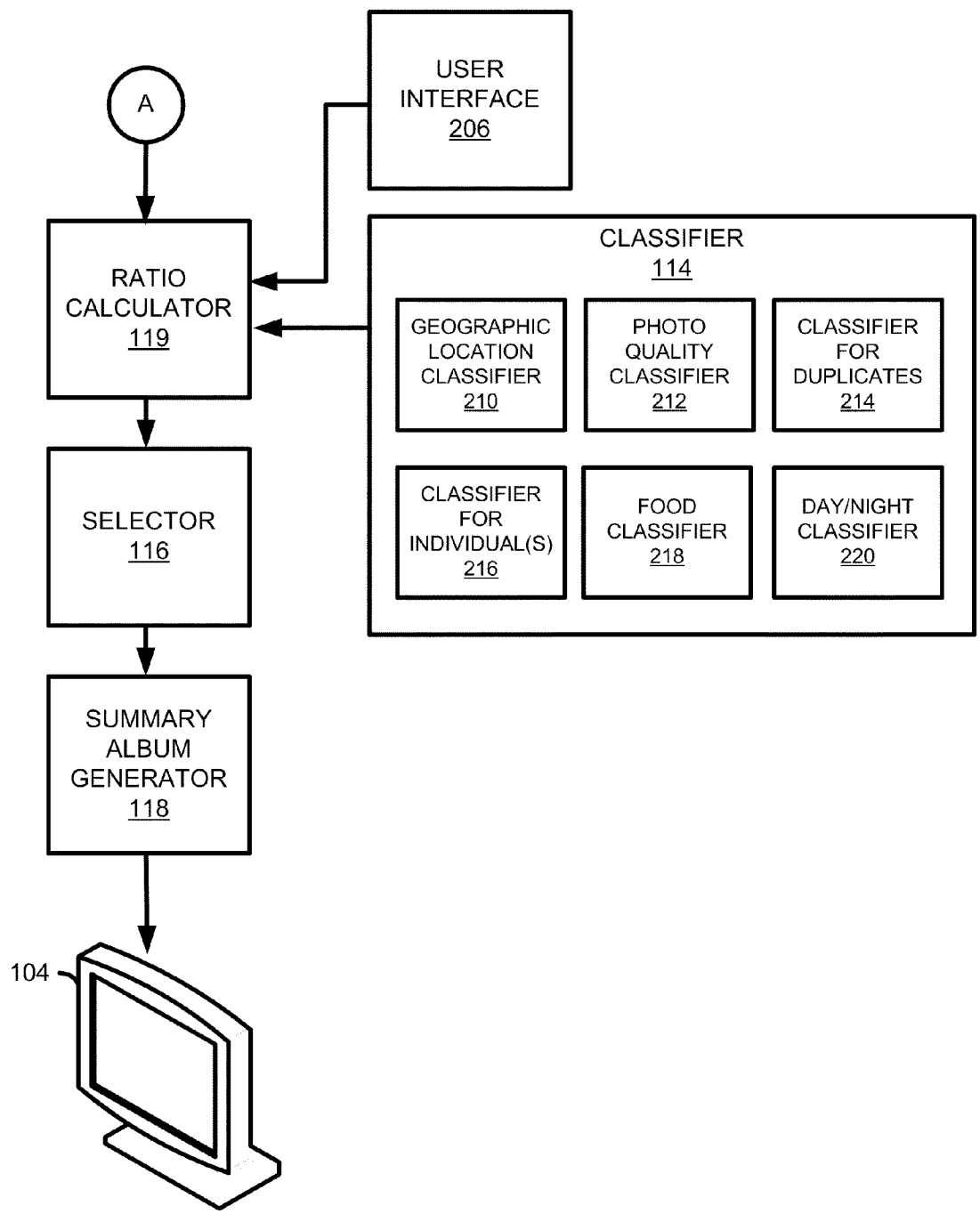

Referring to FIG. 3, the ratio configurator 119 receives a ratio specified according to a user preference. For some implementations, the ratio configurator 119 also receives categories to which the ratio is applied. The categories may be based on those described above which the classifier 114 uses to sort photos 115. For example, suppose a ratio of 3:1 is specified by the user and received via the user interface 206. The user may also specify two categories for the ratio configurator 119 to apply the ratio to. For example, the user might elect to have three times the number of photos depicting individuals as the number of photos depicting the Eiffel Tower.

Figure 8A:
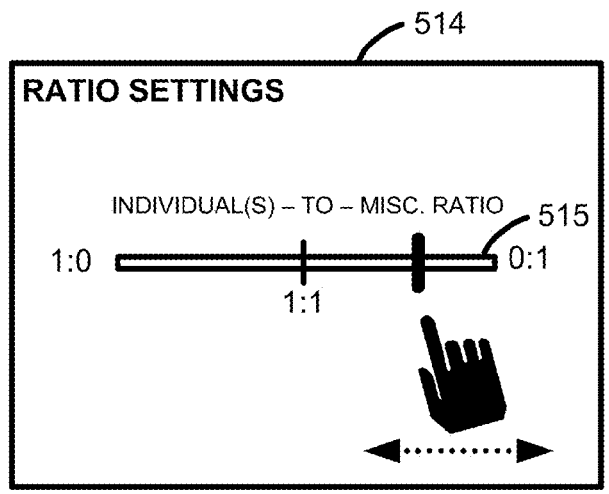
FIGS. 8A-F show various implementations of the user interface that allow a user to specify a target ratio or target percentage.
Figure 8B:
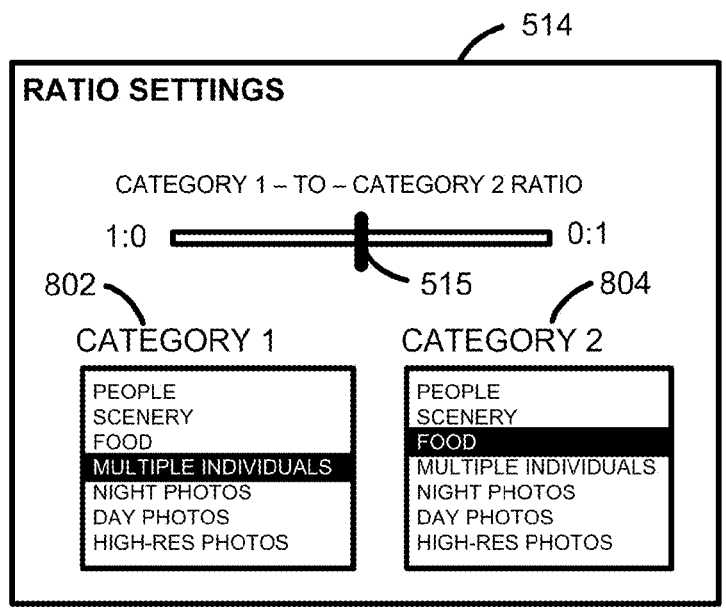
Figure 8B:
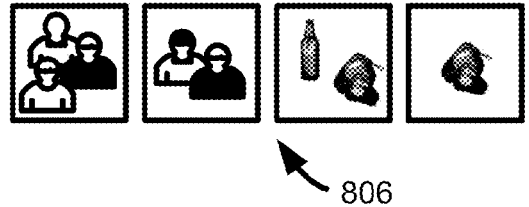

Reference is briefly made to FIG. 8A, which shows an implementation of the user interface 206 for allowing a user to specify a particular ratio. In the example shown, the user interface 206 includes a ratio settings window 514, which may include a controller such as a slider bar 515. Using an input device such as a mouse 108, the user can adjust the slider to a particular ratio setting. The slider bar 515 is just one of various ways into which a ratio may be specified by a user. For example, some implementations may incorporate an edit box, whereby a user types in a ratio. FIG. 8B is another implementation of the ratio settings box 514, whereby a user can specify the categories in which the ratio relates to. In the example shown, the user makes a selection for "Category 1" and for "Category 2." For example, the user can specify a 1:1 ratio for photos depicting multiple individuals to photos depicting food using a combination of the slider bar 515 and the two selection boxes 802, 804. Based on this, the photo summary system 102 selects and displays a summary of photos 806. For some embodiments, the various categories shown in the selection boxes 802, 804 are generated by the ratio configurator 119 based on the categories utilized by the classifier 114.

Figure 8C:
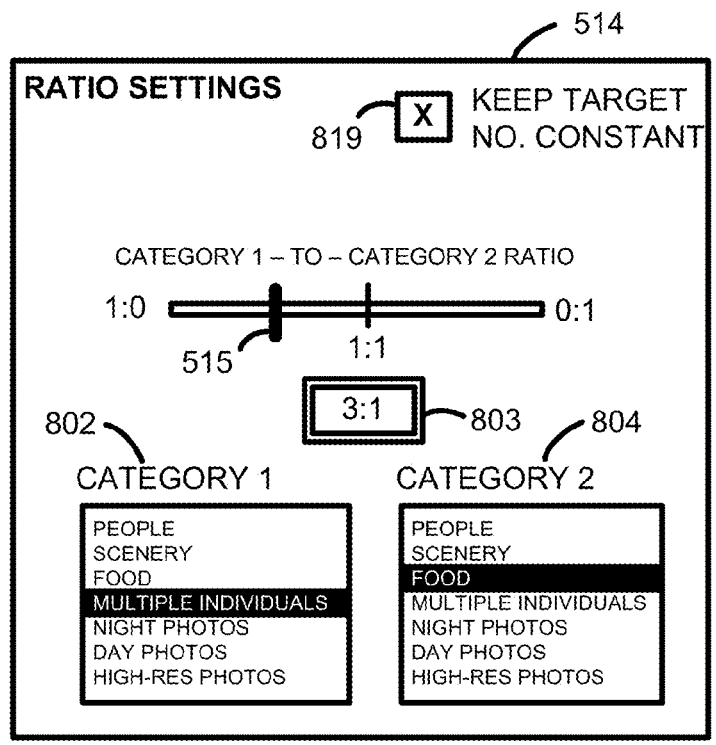
Figure 8C:
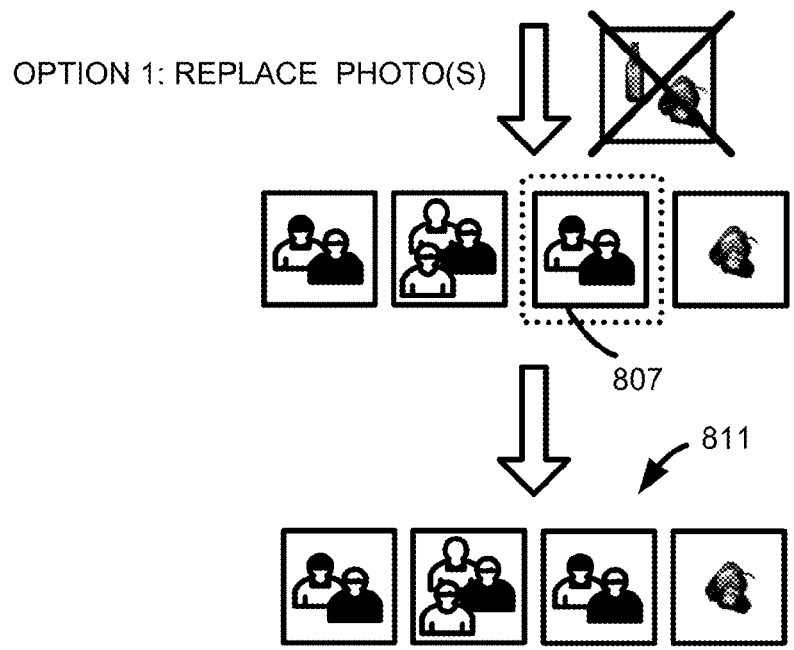

It should be emphasized that in accordance with exemplary embodiments, the summary of photos is adjusted in real-time based on user input. Reference is made to FIG. 8C, which depicts the slider bar 515 being adjusted to set a new ratio value. Specifically, the ratio is increased from a 1:1 ratio to a 3:1 ratio. For example, if the target number of total summary photos specified by the user is 4 photos, a specified ratio of 1:1 results in 2 photos being selected from Category 1 and 2 photos being selected from Category 2 in order to achieve both the specified ratio and the specified target number of total photos. While this example involves use of a slider bar 515, it should be noted that the user can specify the ratio through other means, including an edit box 803, which allows a user to type in a ratio. Based on the previously selected categories (multiple individuals, food) and the new ratio setting of 3:1, the summary of photos is modified accordingly in real-time. For one embodiment, one of the photos depicting food in FIG. 8B is replaced by a photo 807 depicting multiple individuals selected from Category 1, and thus, the summary result remains at a total of 4 photos 811, whereby 3 photos comprise individuals and 1 photo comprises food in order to meet the newly specified ratio of 3:1. In accordance with one aspect of this embodiment, a checkbox 819 or other selection means/controller is provided on the user interface 514, which allows the user to specify whether to keep the target number of summary photos constant so that changes to the ratio do not affect the target number of photos. As shown, the selection box 819 is checked and thus, the target number of photos is kept constant. Note that the "target number" is to be distinguished from the "total number" of photos. For purposes of this disclosure, the "target number" refers to a number of summary photos specified by the user through the various means described herein, whereas the "total number" generally refers to the total number of available photos from which the summary of photos is derived.

Figure 8D:
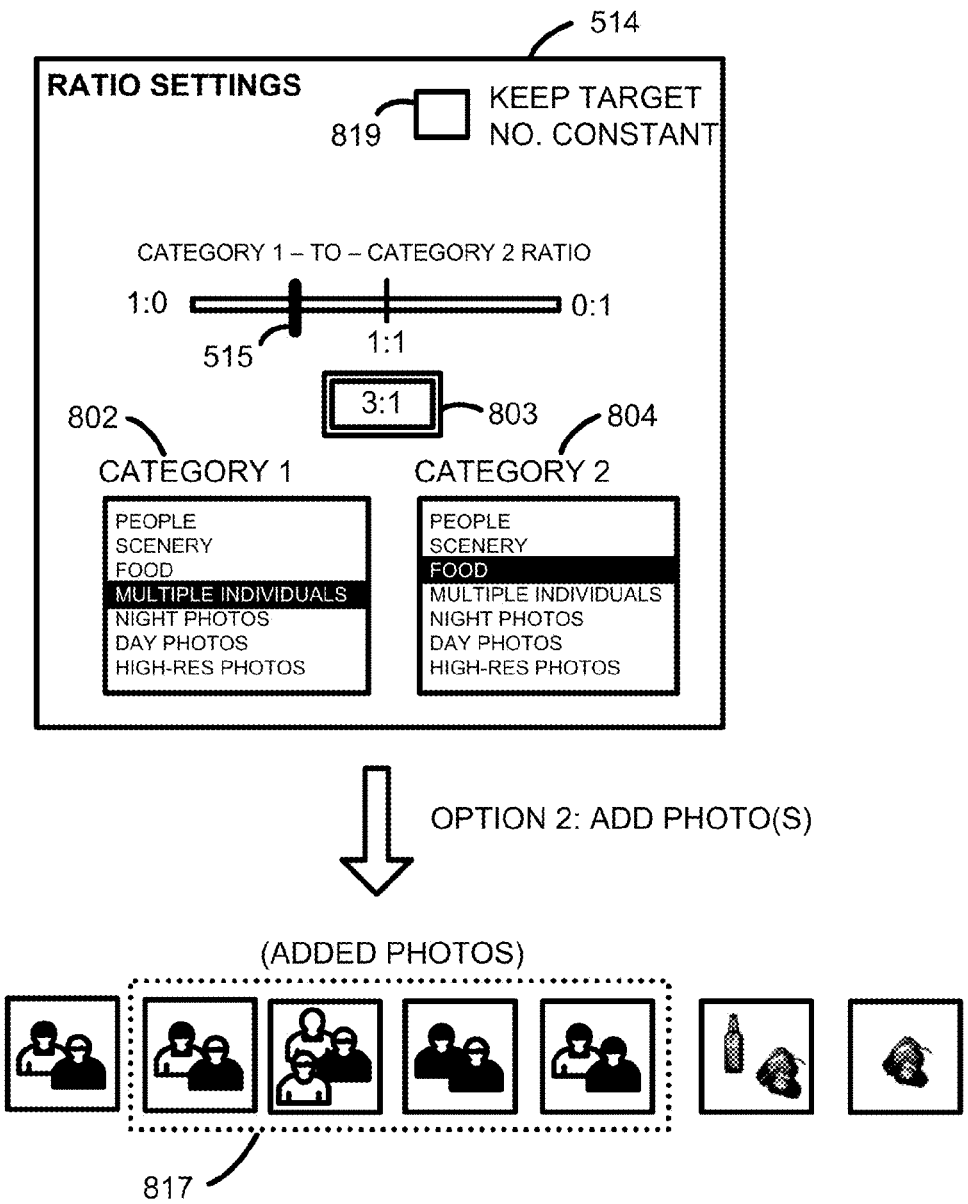

FIG. 8D depicts another embodiment in which the target number of summary photos is variable in nature and increased to meet the specified ratio of 3:1. As shown, the selection box 819 is unchecked. In accordance with such embodiments, additional photos 817 depicting multiple individuals are selected and added to the original set of photos 806 such that the summary result contains a total of 8 photos, where 6 photos depict individuals and 2 photos depict food to meet the specified ratio of 3:1. This is an alternative to replacing photos and is designated as "OPTION 2: ADD PHOTO(S)" in FIG. 8D. Note that in addition to a new ratio, the user can also specify new categories 802, 804 to modify the summary of photos.

Figure 8E:
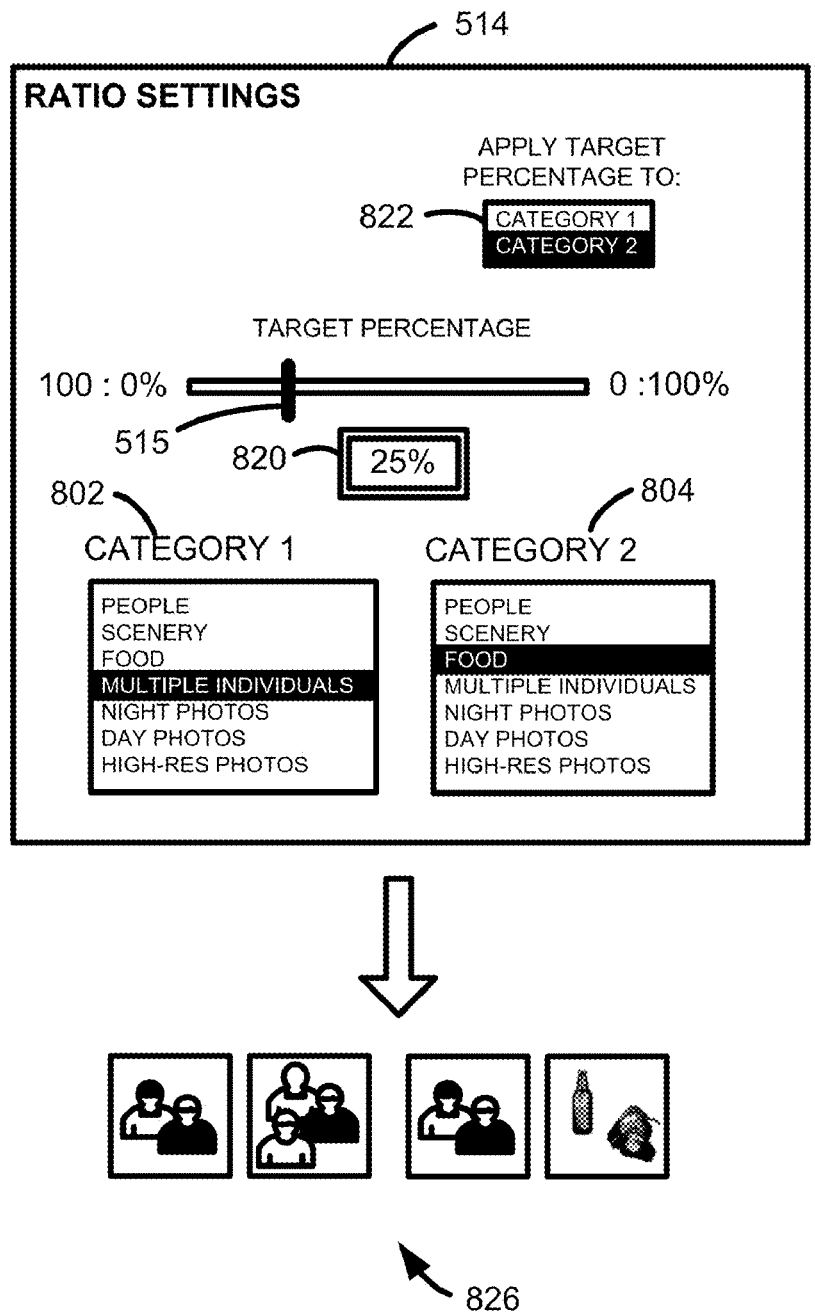

FIG. 8E show an implementation of the user interface 514 that allows a user to specify a target percentage, as described earlier. For such implementations, the user may designate a category using the selection box 822 in which to apply the target percentage specified using the slider bar 515. The edit box 820 may also be used to manually enter a target percentage. Based on this, a collection of photos 826 is selected that comprises a subset of photos (3 photos) from Category 1 and a subset of photos (1 photo) from Category 2.

Figure 8F:
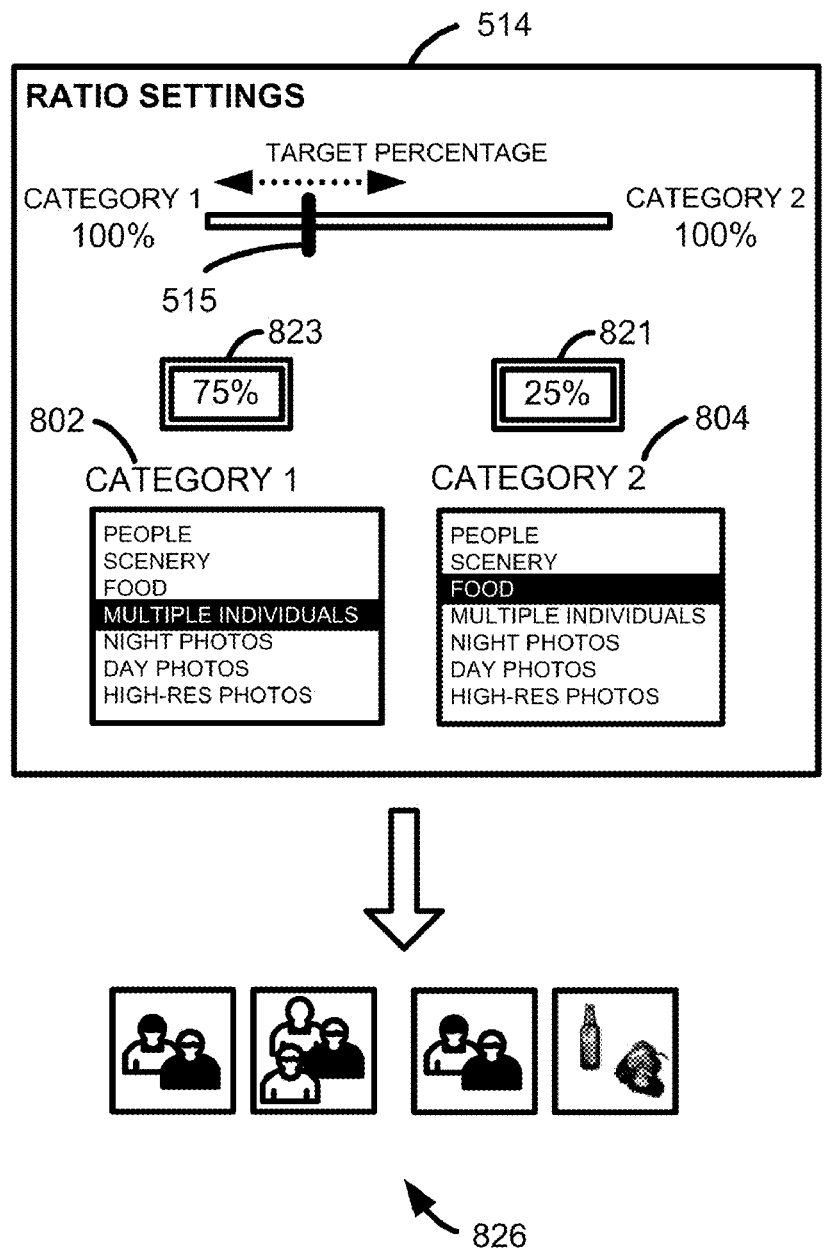

FIG. 8F show an alternative implementation of the user interface 514 that allows a user to specify a target percentage. As shown, the value associated with the location of the slider bar 515 ranges from a percentage of 100% for Category 1 to 100% for Category 2, whereby centering the slider bar 515 signifies a 50:50 composition of Category 1 photos and Category 2 photos. To illustrate, if the slider is located all the way to the left (i.e., 100% for Category 1), the summary of photos 826 comprises only photos from Category 1.

For the implementation in FIG. 8F, the user may specify a target percentage for either Category 1 or Category 2 by using the slider bar 515 or the edit boxes 821, 823. Note that when the target percentage is specified for one of the edit boxes 821, 823, the other edit box 821, 823 is automatically updated such that the total percentage is 100 percent. Referring to the nonlimiting example in FIG. 8F, if a user specifies a percentage of 25 percent for Category 2 (food) using the corresponding edit box 821, then the value in the other edit box 823 is automatically updated to 75 percent. Similarly, the user can adjust the target percentage value in the edit box 823 for Category 1 (multiple individuals), and the value of the other edit box 821 will be automatically updated. In this regard, the user can specify a target percentage using either edit box 821, 823. Based on the specified target percentage, a collection of photos 826 is selected that comprises a subset of photos (3 photos) from Category 1 and a subset of photos (1 photo) from Category 2.

Referring back to FIG. 3, the selector 116 selects photos 115 according to the results from the ratio calculator 115. In the illustration shown in FIG. 8B, two categories were selected—photos depicting multiple individuals and photos depicting food. Based on the total number of photos within each corresponding category, the selector 116 in FIG. 3 selects an appropriate number of photos from each category. As an illustration, suppose that a user specifies that the summary of photos should comprise a target number of 42 photos. Suppose also that Category 1 (photos of multiple individuals) contains a total of 65 photos and that Category 2 (photos depicting food) contains a total of 21 photos. Finally, suppose that the user specifies a ratio of 1:1.

For some embodiments, the selector 116 selects 21 photos from each category in order to meet the specified ratio (1:1) and in order to meet the target number of photos specified by the user (i.e., 42 photos). To select 21 photos from the 65 photos in Category 1, the selector 116 may prioritize by selecting the 21 photos with faces closest in time to the 21 photos depicting food. This may be performed based on the sorting performing by the time analysis module 112. The selector 116 also selects or excludes photos 115 based on any user tags received by the user tag module 113. The selector 116 may also prioritize by selecting higher quality photos. In this regard, the user has control over which photos to include in the summary of photos and which photos to exclude. Based on the selections by the selector 116, the summary album generator 118 displays the final summary of photos onto a display device 104.

Note that in some cases, a user might specify a target number of photos that isn't compatible with a target ratio (also specified by the user). Referring to the example above in which the user specifies a target ratio of 1:1. Suppose that the user specifies a target number of 50 and that there are only 21 photos are available in Category 2. Because there are an insufficient number of available photos in Category 2 to select 25 photos to achieve a 1:1 ratio and also achieve the target number of 50, the selector 116 may be configured to prioritize the target number over the target ratio. As such, the selector 116 may select 29 photos from Category 1 and 21 photos from Category 2 to yield a total of 50 photos and thereby override the target ratio requirement. In alternative embodiments, however, the selector 116 may be configured to prioritize the target ratio over the target number. For such embodiments, the selector 116 selects 21 photos from both Category 1 and Category 2 to achieve the 1:1 target ratio. The order of priority may be specified by the user.

Figure 4:
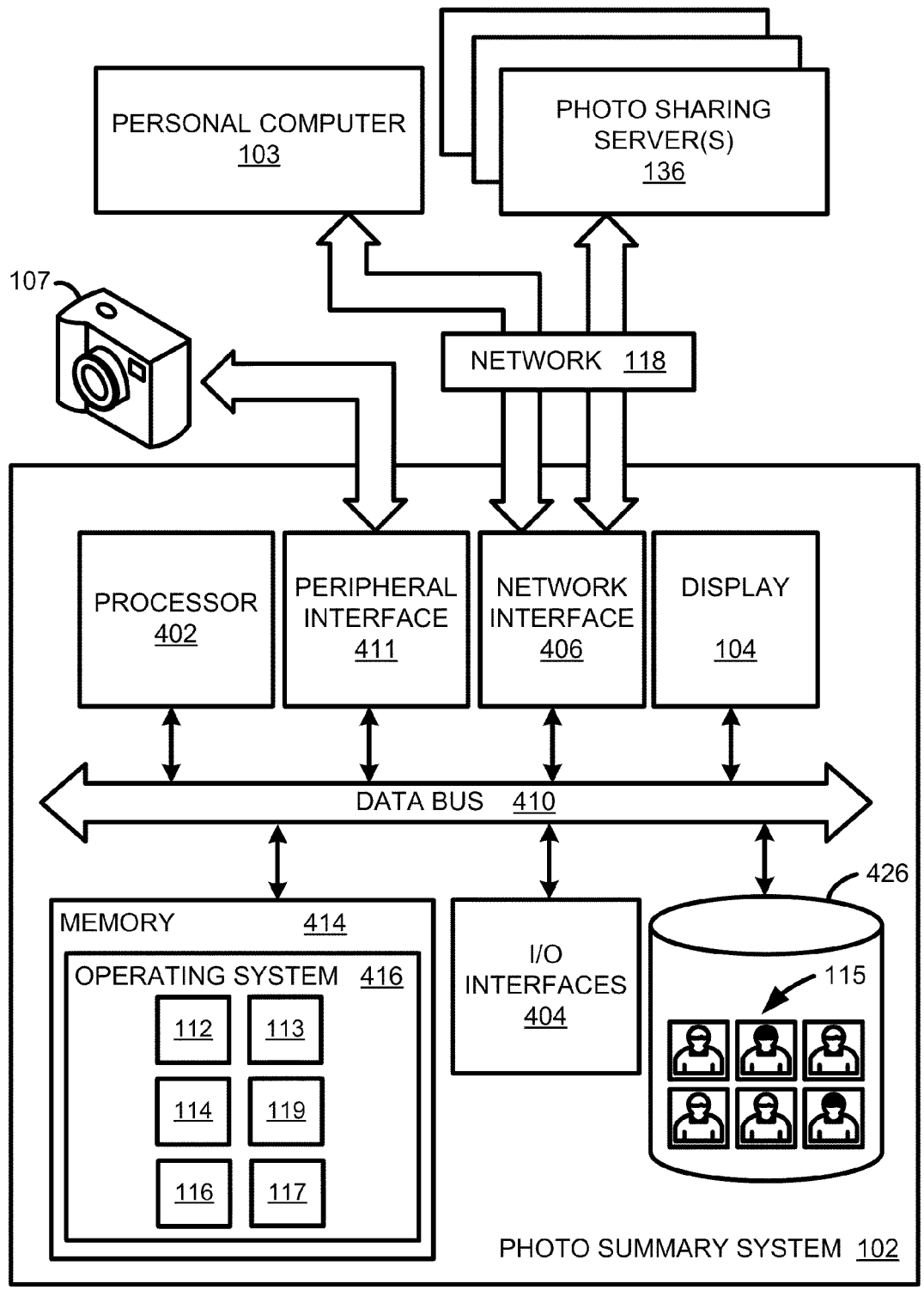
FIG. 4 illustrates an embodiment of the photo summary system in FIG. 1.

FIG. 4 illustrates an embodiment of the photo summary system 102 shown in FIG. 1. The photo summary system 102 may comprise any one of a wide variety of wired and/or wireless computing devices, such as a desktop computer, portable computer, dedicated server computer, multiprocessor computing device, smartphone, personal digital assistant (PDA), and so forth. As shown in FIG. 4, the photo summary system 102 comprises memory 414, a processing device 402, a number of input/output interfaces 404, a network interface 406, a display 408, a peripheral interface 411, and mass storage 226, wherein each of these devices are connected across a local data bus 410.

The processing device 402 may include any custom made or commercially available processor, a central processing unit (CPU) or an auxiliary processor among several processors associated with the photo summary system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 414 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 414 typically comprises a native operating system 416, one or more native applications, emulation systems, or emulated applications for any of a variety of operating systems and/or emulated hardware platforms, emulated operating systems, etc. For example, the applications may include application specific software which may comprise the time analysis module 112, the user tag module 113, the classifier 114, the ratio configurator 119, the selector 116, and the summary album generator 117. In accordance with such embodiments, the modules 112, 113, 114, 119, 116 are executed by the processor 202. One of ordinary skill in the art will appreciate that the memory 414 can, and typically will, comprise other components which have been omitted for purposes of brevity.

Input/output interfaces 404 provide any number of interfaces for the input and output of data. For example, where the photo summary system 102 comprises a personal computer, these components may interface with user input device 404, which may be a keyboard 106 or a mouse 108, as shown in FIG. 1. Where the photo summary system 102 comprises a gaming console, the input/output interfaces 404 may communicate with a video game controller such as, for example, the wireless Wii Remote® and Wii MotionPlus® from Nintendo or the DualShock® and wand-shaped motion controller from Sony. Display 408 can comprise, for example, a computer monitor, plasma television, or a liquid crystal display (LCD). As will be described in more detail later, a user may enter tag information via a user interface rendered on the display 104 using the input/output interfaces 404.

In the context of this disclosure, a computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 4, network interface device 406 comprises various components used to transmit and/or receive data over a network environment. For example, the network interface 406 may include a device that can communicate with both inputs and outputs, for instance, a modulator/demodulator (e.g., a modem), wireless (e.g., radio frequency (RF)) transceiver, a telephonic interface, a bridge, a router, network card, etc.). As shown in FIG. 4, the photo summary system 102 may communicate with one or more photo sharing servers 136 or another photo summary system 103 via the network interface 406 over the network 118. The photo summary system 102 may further comprise mass storage 226 which stores and manages such data as received digital images 115. The peripheral 411 interface supports various interfaces including, but not limited to IEEE-1394 High Performance Serial Bus (Firewire), USB, a serial connection, and a parallel connection.

Figure 5:
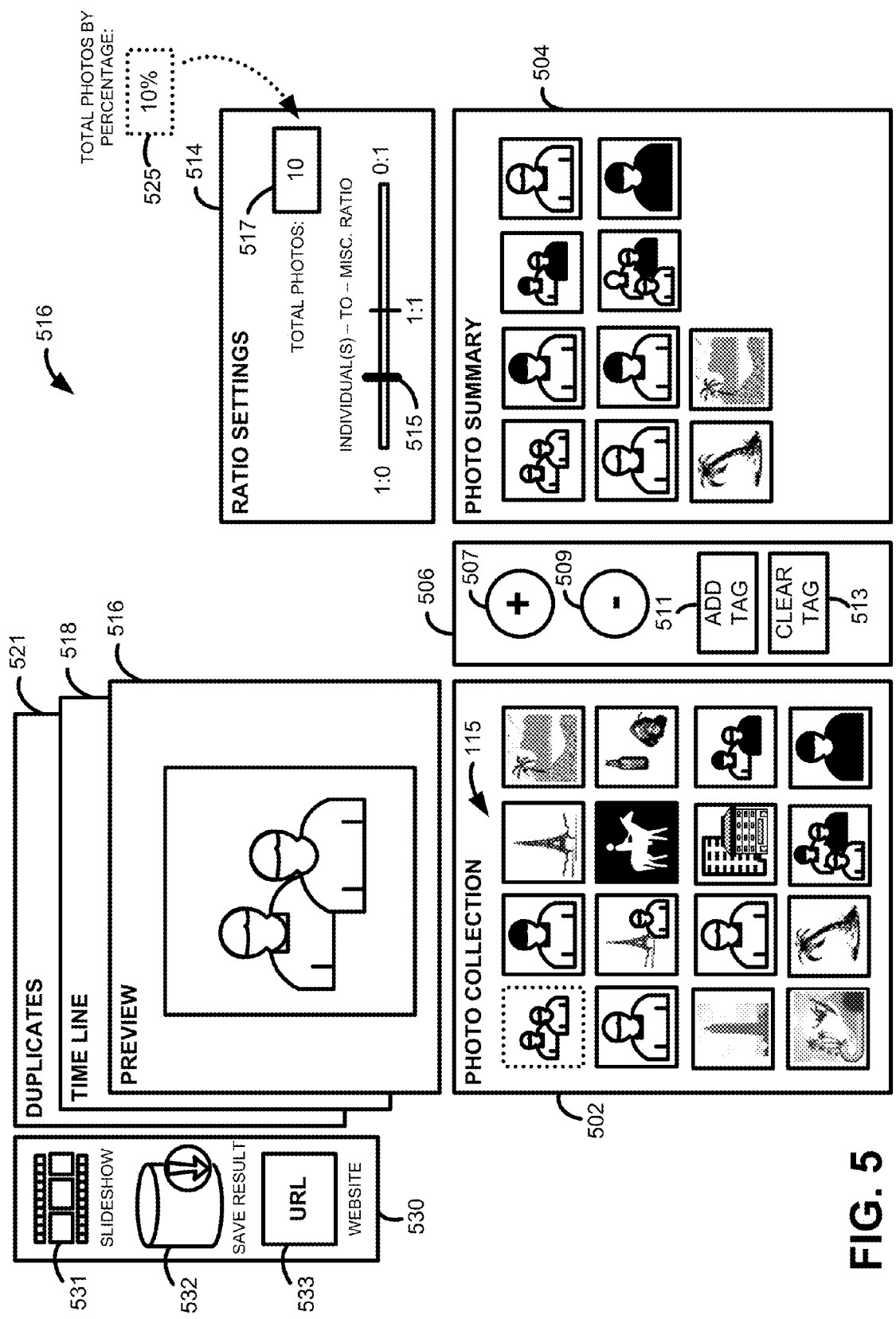
FIG. 5 depicts an exemplary user interface for generating a summary of photos using the photo summary system in FIG. 1.

Reference is now made to FIG. 5, which depicts an exemplary user interface 516 for generating a summary of photos. The user interface 516 may comprise various sections, including a preview window 516, a time line window 518, a duplicates window 521, a ratio settings window 514, a photo collection window 502, and a photo summary window 504. The user interface 516 further comprises a toolbar 530, which allows the user to further process and/or store of the summary of photos for future access. The preview window 516 displays the photo 115 currently selected (the photo shown with a dashed line in the photo collection 502 window). Alternatively, the preview window 516 may be used to view photos shown in the photo summary section as the photos in the photo summary section may be comprised of thumbnails. The user can select one of the thumbnails and preview the image in the preview window 516.

The time line window 518 displays the results of the time analysis module 112 of FIG. 1 and is described in more detail below. The duplicates window 521 displays photos which are exact or substantial duplicates of each other. The displayed photos are based on the analysis performed by the duplicates classifier 214 in FIG. 2. Through the duplicates window 521, the user can manually delete duplicates to avoid duplicates being displayed in the photo summary window 504. As described below, this may be accomplished using the tools section 506. The classifier for duplicates 214 may be further configured to automatically select at most one photo with the highest quality from among a plurality of photos classified as duplicates. However, the number of duplicate photos to be selected is dependent upon the target number of the summary photos. By way of example, suppose the total number of photos is ten, and five of the photos are duplicate photos. Suppose also that the specified target number of summary photos is seven. Based on this, two duplicate photos are selected from among the group of duplicate photos.

The ratio settings window 514 allows a user to enter a specified ratio as well as a target number of summary photos. The ratio configurator 119 and selector 116 in FIG. 3 then select a subset of photos 115 based on the specified ratio. As described earlier, the user specified ratio may be received via a slider bar 515 such as the one shown or through some other means. Similarly, the target number of summary photos may be entered via a controller 517 in the ratio settings window 514. Based on the specified total and the specified ratio, the make-up of the summary photos in the photo summary window 504 is set accordingly. In alternative embodiments, a percentage figure may specified by the user using an edit box 525 (shown in dashed lines) or other controller to specify the target number of summary photos. For such embodiments, the value represents a percentage of the total photos available. For example, a value of 10 percent results in a target number of summary photos equal to 10 percent of the total available photos. Thus, if there are a total of 40 photos available, the target number of summary photos will be 4. The photo collection window 115 depicts all the photos 115 received by the photo summary system 102. Using the tools section 506, the user can assign tags to particular photos 115. For example, the "+" icon can be used to tag certain photos 115 to be included in the photo summary window 504. The "−" icon can be used to exclude certain photos 115 from the photo summary window 504.

Figure 6:
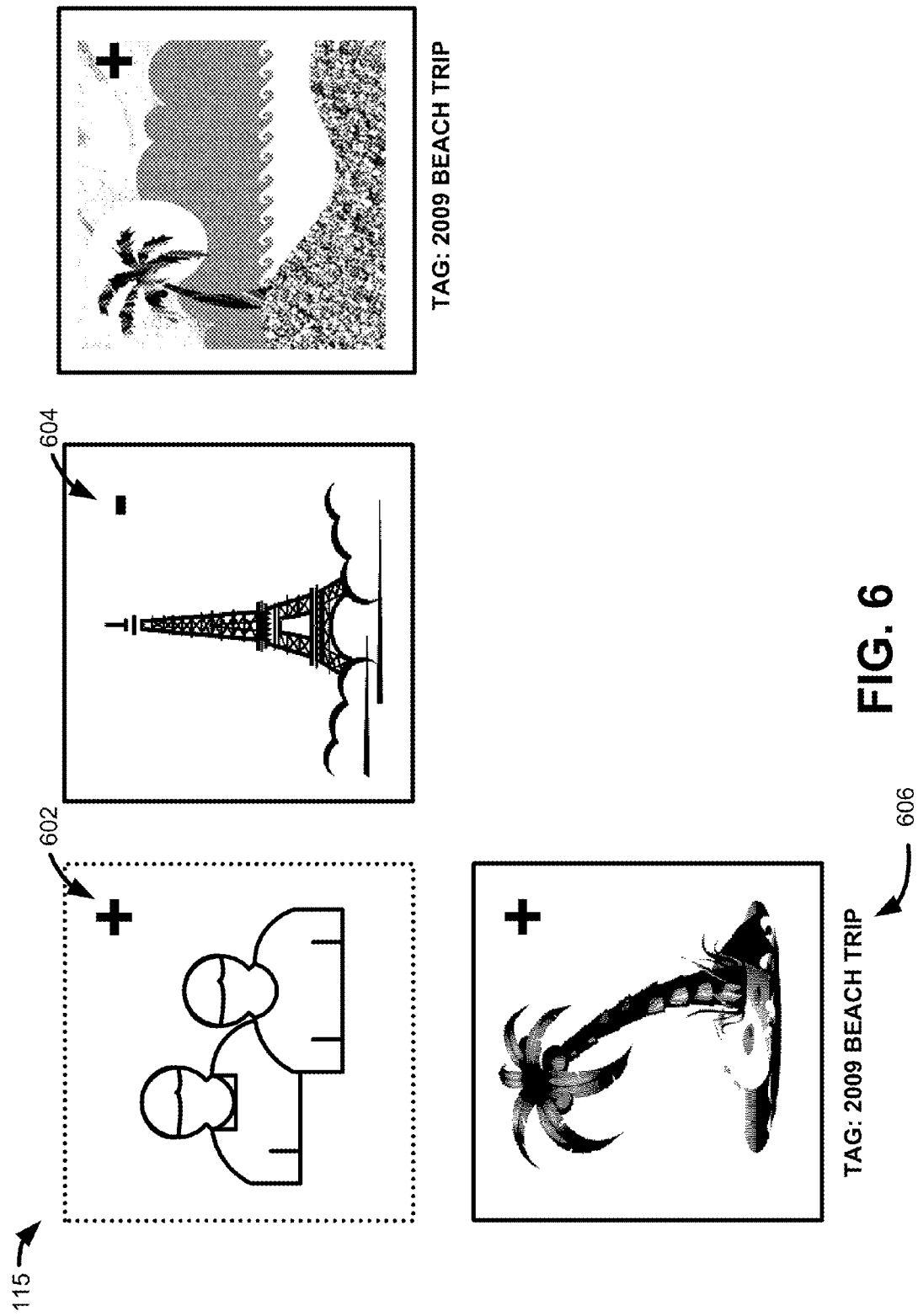
FIG. 6 illustrates tag data assigned to photos using the photo summary system in FIG. 1.

The "Add Tag" button 511 allows the user to specify a custom tag to particular photos 115. With reference to FIG. 6, a photo 115 designated by the user to be included may include a "+" graphic 602 on the photo. Similarly, a photo 115 designated by the user to be excluded from the photo summary may include a "−" graphic. The user may use the "Add Tag" button 511 to associate a particular tag (e.g., "2009 beach trip") to particular photos. Through this feature, the user can assign the same customized tag to multiple photos, thereby associating the photos with each other. The clear tag button 513 may be included in the user interface 500 to clear all tags. The photo summary window 504 displays the results from the photo album generator 117.

The toolbar 530 for further processing and/or storing the photos in the summary window 504 may include, among other options, an option 531 to generate a slideshow comprising the summary of photos. For some implementations, the generated slideshow may then be stored for future viewing of the summary of photos. The toolbar 530 further comprises an option 532 to save the summary of photos to a target folder or other destination within the photo summary system 102. The target folder may be a predetermined folder or may be a folder specified by the user. The toolbar 530 may also comprise an option 533 to upload the summary of photos to a website for not only storage, but also for allowing others to view the summary of photos. As a nonlimiting example, the photo summary system 102 may upload the summary of photos to such websites as Facebook®, Google Picasa®, or Flickr®.

Figure 7:
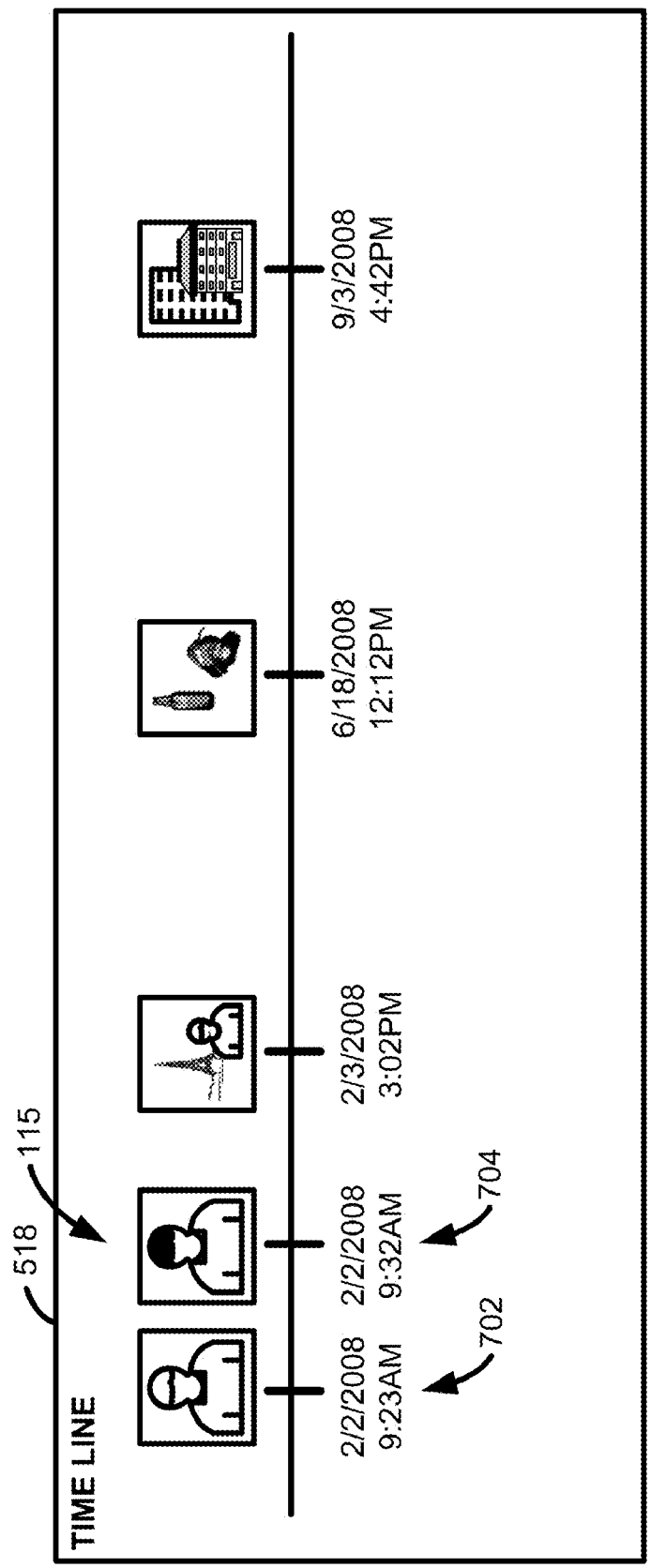
FIG. 7 shows the time line window depicted in the exemplary user interface of FIG. 5.

FIG. 7 shows the time line window 518 depicted in the user interface 500 of FIG. 5. As described earlier, the time analysis module 112 receives the photos 115 and based on time information 702, 704 associated with the photos 115, sorts the photos 115. In the illustration shown, the photos 115 are sorted in ascending order. As also described earlier, the time information 702, 704 may be based on various sources of information. For those photos stored according to the EXIF standard, the time analysis module 112 retrieves time information 702, 704 from metadata stored with the photos 115. The creation time stamp or update time stamp may also be used. The sorting performed by the time analysis module 112 is used to aid in the selection process.

Figure 9:
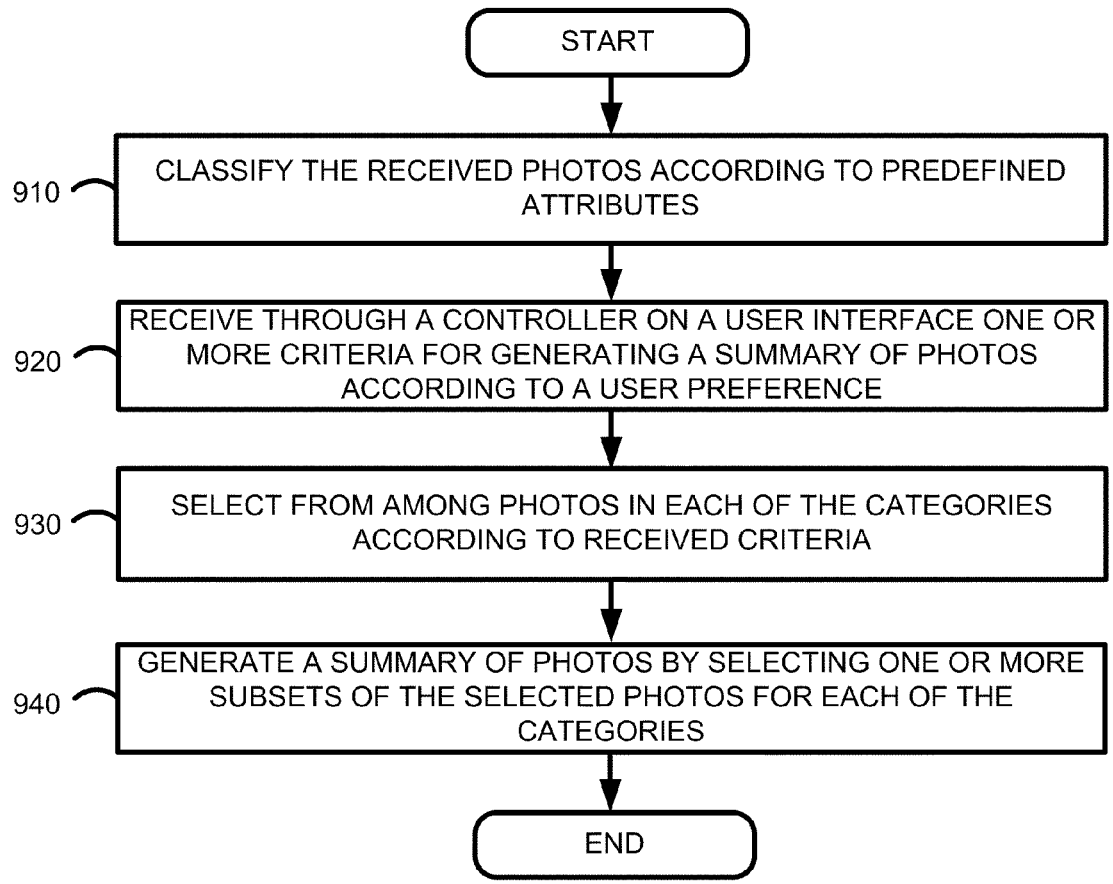
FIG. 9 is an embodiment for generating photo summaries using the photo summary system in FIG. 1.

FIG. 9 is a flowchart 900 of an embodiment for generating photo summaries using the photo summary system 102 in FIG. 1. Block 910 begins by classifying the received photos into one or more categories according to predefined attributes. In block 920, the photo summary system 102 receives one or more criteria for generating a summary of photos according to a user preference. In block 930, a selection is made from among photos in each of the categories according to received criteria, and in block 940, a summary of photos is generated by selecting one or more subsets of the selected photos for each of the categories.

Figure 10:
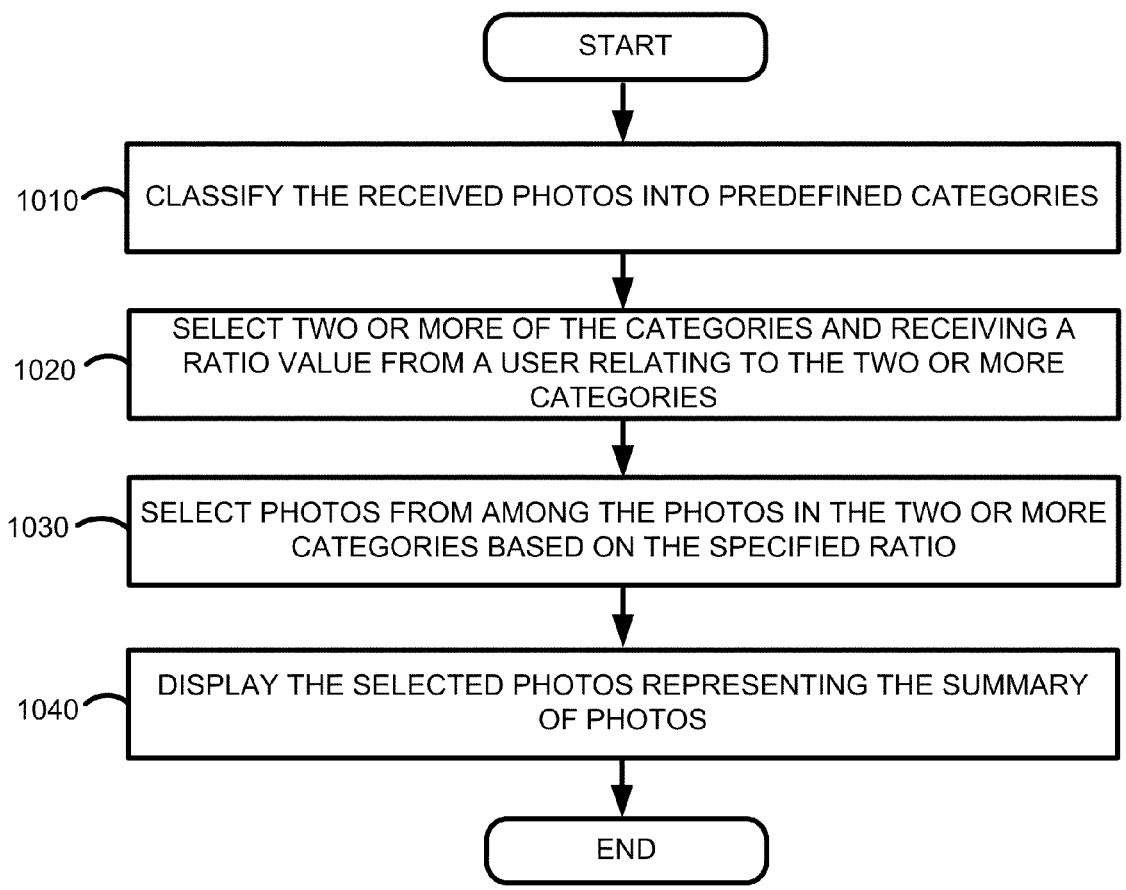
FIG. 10 is another embodiment for generating photo summaries using the photo summary system in FIG. 1.

FIG. 10 is another embodiment for generating photo summaries using the photo summary system 102 in FIG. 1. In block 1010, the received photos are classified into predefined attributes. Block 1020 continues by selecting two or more of the categories and receiving a ratio value from a user relating to the two or more categories. In block 1030, photos are selected from among the photos in the two or more categories based on the specified ratio, and in block 1040 the selected photos representing the summary of photos are displayed.

It should be noted that if embodied in software, each block in FIGS. 9 and 10 may represent a module, segment, or portion of code that comprises program instructions to implement the specified logical function(s). The program instructions may be embodied in the form of source code that comprises statements written in a programming language or machine code that comprises numerical instructions recognizable by a suitable execution system such as a processor in a computer system or other system such as the photo summary system 102 shown in FIG. 1. The machine code may be converted from the source code, etc. If embodied in hardware, each block may represent a circuit or a number of interconnected circuits to implement the specified logical function(s).

It should also be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A method executed by a processor for generating a summary of photos from a plurality of received photos, comprising:
    classifying the received photos into one or more categories according to predefined attributes;
    receiving through a controller on a user interface one or more criteria for generating a summary of photos according to a user preference, wherein the one or more criteria comprises at least one of:
    a target number of photos for the one or more of the categories in the summary of photos, wherein the target number of photos comprises specifying at least one percentage of photos for one or more of the categories that makes up a total number of summary photos; and
    a target ratio of photos for one or more of the categories in the summary of photos, wherein the target ratio comprises a ratio of photos depicting individuals to photos depicting landscapes;
    selecting from among photos in each of the categories according to received criteria;
    generating the summary of photos by selecting one or more subsets of the selected photos for each of the categories, wherein the summary of photos comprises combining the one or more subsets of photos into a single summary result; and
    displaying the summary of photos.

2. The method of claim 1, further comprising sorting the received photos based on time information associated with the received photos.

3. The method of claim 2, further comprising:
    classifying photos according to the time information;
    selecting photos according to the time information and at least one of the predefined attributes; and
    displaying the summary of photos according to the time information.

4. The method of claim 3, wherein selecting according to time information associated with the photos comprises selecting based on a time difference between each pair of consecutively sorted photos and a predetermined time interval.

5. The method of claim 4, wherein selecting according to a time difference between each pair of consecutively sorted photos and a predetermined time interval comprises:
    inserting a division marker between a pair of consecutively sorted photos if the time difference between the pair of consecutively sorted photos exceeds the predetermined time interval; and
    based on the insertion of a division marker, determining that the two photos correspond to different events.

6. The method of claim 1, further comprising storing the summary of photos for future access.

7. The method of claim 6, wherein storing the summary of photos for future access further comprises at least one of:
    storing the summary of photos in a target folder;
    generating a slideshow from the summary of photos and storing the slideshow as a file; and
    uploading the summary of photos to a website.

8. The method of claim 1, wherein generating the summary of photos further comprises separately displaying summary results for the categories, wherein the summary results comprise the selected one or more subsets of the selected photos for each of the categories.

9. The method of claim 1, wherein the one or more categories comprise indoor photo shots, outdoor photo shots, night photos, day photos, photos comprising geographic location, time, food, photo quality, photos of scenery, the presence of a plurality of individuals, the presence of only a single individual, and the presence of a specific individual.

10. The method of claim 9, wherein the presence of a plurality of individuals comprises a predetermined number of people in the photo.

11. The method of claim 1, wherein the predefined attributes comprises EXIF information, quality, exposure level, degree of focus, color contrast, color saturation, color layout, color histogram, edge layout, face information, time information, and geographic location.

12. The method of claim 11, wherein classifying the received photos into one or more categories according to quality comprises:
   determining whether the received photos contain one or more of smiling faces and closed eyes;
   classifying received photos with smiling faces as being relatively high in quality; and
   classifying received photos with closed eyes as being relatively low in quality.

13. The method of claim 1, further comprising performing one of:
   maintaining a target number of summary photos during revision of the selection of photos; and
   adjusting the target number of summary photos to achieve a target ratio of photos for one or more of the categories in the summary of photos during revision of the selection of photos.

14. The method of claim 1, further comprising:
   receiving one or more additional criteria according to the user preference to revise the selection of photos for each of the predefined attributes assigned values; and
   displaying the revised selection of photos for each of the predefined attributes assigned values.

15. The method of claim 1, wherein the controller comprises one of a slider bar and an edit box for receiving the one or more criteria for the one or more of the categories according to the user preference.

16. The method of claim 1, wherein the one criteria comprise one of ranges of time and specific geographic locations.

17. The method of claim 1, further comprising:
   receiving tags for one or more of the received photos; and
   including or excluding the tagged photos from the summary of photos based on the tags.

18. The method of claim 1, further comprising detecting duplicate photos among the received photos.

19. The method of claim 18, wherein selecting from among photos in each of the categories according to received criteria further comprises selecting at most one photo among a plurality of photos classified as duplicates.

20. A computer-readable medium embedded with a computer program for generating a summary of photos from a plurality of received photos, wherein the computer program is executed by a processor to perform said method comprising:
   classifying the received photos into one or more categories according to predefined attributes;
   receiving through a controller on a user interface one or more criteria for generating a summary of photos according to a user preference, wherein the one or more criteria comprises at least one of:
      a target number of photos for the one or more of the categories in the summary of photos, wherein the target number of photos comprises specifying at least one percentage of photos for one or more of the categories that makes up a total number of summary photos; and
      a target ratio of photos for one or more of the categories in the summary of photos, wherein the target ratio comprises a ratio of photos depicting individuals to photos depicting landscapes;
   selecting from among photos in each of the categories according to received criteria;
   generating the summary of photos by selecting one or more subsets of the selected photos for each of the categories, wherein the summary of photos comprises combining the one or more subsets of photos into a single summary result; and
   displaying the summary of photos.

21. A system for generating a summary of photos from a plurality of received photos, comprising:
   a processor;
   a classifier for classifying the received photos into one or more categories according to predefined attributes;
   a controller on a user interface for receiving one or more criteria for generating a summary of photos according to a user preference, wherein the one or more criteria comprises at least one of:
      a target number of photos for the one or more of the categories in the summary of photos, wherein the target number of photos comprises specifying at least one percentage of photos for one or more of the categories that makes up a total number of summary photos; and
      a target ratio of photos for one or more of the categories in the summary of photos, wherein the target ratio comprises a ratio of photos depicting individuals to photos depicting landscapes;
   a controller on a user interface for selecting from among photos in each of the categories according to received criteria;
   a generator for generating the summary of photos by selecting one or more subsets of the selected photos for each of the categories, wherein the summary of photos comprises combining the one or more subsets of photos into a single summary result; and
   a display for displaying the summary of photos.

22. The system of claim 21, further comprising a user tag module for receiving tags for one or more of the received photos and including or excluding the tagged photos from the summary of photos based on the tags.

23. The system of claim 21, wherein the ratio configurator receives the specified ratio through one of a slider controller and an edit box provided on a user interface.

24. The system of claim 21, further comprising a time analysis module for sorting the received photos based on time information associated with the received photos.

25. The system of claim 24, wherein the selector further selects photos based on the order of sorted photos by the time analysis module.

26. The system of claim 21, further comprising a duplicate detector for detecting duplicate photos in the received photos.

27. The system of claim 26, wherein the selector further selects from among photos in each of the categories at most one photo among a plurality of photos classified as duplicates.

* * * * *